United States Patent
Oostveen et al.

(10) Patent No.: US 10,045,054 B2
(45) Date of Patent: *Aug. 7, 2018

(54) METHOD AND DEVICE FOR GENERATING AND DETECTING A FINGERPRINT FUNCTIONING AS A TRIGGER MARKER IN A MULTIMEDIA SIGNAL

(71) Applicant: Gracenote, Inc., Emeryville, CA (US)

(72) Inventors: Job Cornelis Oostveen, Haren (NL); Warner Rudolph Theophile Ten Kate, Eindhoven (NL); Adrianus Johannes Maria Denissen, Eindhoven (NL); David K. Roberts, Cheddar (GB)

(73) Assignee: Gracenote, Inc., Emeryville, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/622,024

(22) Filed: Jun. 13, 2017

(65) Prior Publication Data

US 2017/0289590 A1 Oct. 5, 2017

Related U.S. Application Data

(63) Continuation of application No. 15/273,185, filed on Sep. 22, 2016, now Pat. No. 9,712,853, which is a (Continued)

(30) Foreign Application Priority Data

Jul. 11, 2003 (EP) .................................. 03102116

(51) Int. Cl.
*H04N 21/234* (2011.01)
*H04N 21/81* (2011.01)
(Continued)

(52) U.S. Cl.
CPC ..... *H04N 21/23418* (2013.01); *H04N 19/467* (2014.11); *H04N 21/23109* (2013.01);
(Continued)

(58) Field of Classification Search
CPC ......... H04N 21/23418; H04N 21/8133; H04N 21/435; H04N 21/44008; H04N 21/4394;
(Continued)

(56) References Cited

U.S. PATENT DOCUMENTS 6,785,815 B1 8/2004 Serret-Avila et al.
6,959,865 B2 11/2005 Walczyk et al.
(Continued)

FOREIGN PATENT DOCUMENTS

EP 1054335 A2 11/2000
WO WO 0161987 A2 8/2001
(Continued)

OTHER PUBLICATIONS

U.S. Appl. No. 10/564,297, Non-Final Office Action dated Jul. 12, 2010, 11 pages.
(Continued)

*Primary Examiner* — Darren B Schwartz
(74) *Attorney, Agent, or Firm* — McDonnell Boehnen Hulbert & Berghoff LLP

(57) ABSTRACT

A device is configured to perform a method that detects a trigger marker for an action corresponding to a segment of a multimedia signal. A fingerprint is generated based on the segment of the multimedia signal at a trigger time point. The generated fingerprint is stored in a database and communicated to the device. During playback of the multimedia signal, fingerprints of segments of the multimedia signal are generated and matched against fingerprints in the database. When a match is found, one or more associated actions for the segment are retrieved by the device. The trigger time
(Continued)

point may be determined as a time point near or at the segment of the multimedia signal with the matched fingerprint. In this way, trigger markers for actions may be enabled without modifying the multimedia signal.

20 Claims, 3 Drawing Sheets

Related U.S. Application Data continuation of application No. 15/164,605, filed on May 25, 2016, now Pat. No. 9,479,831, which is a continuation of application No. 14/659,044, filed on Mar. 16, 2015, now Pat. No. 9,407,962, which is a continuation of application No. 14/151,879, filed on Jan. 10, 2014, now Pat. No. 9,066,114, which is a continuation of application No. 13/220,267, filed on Aug. 29, 2011, now Pat. No. 8,660,267, which is a continuation of application No. 10/564,297, filed as application No. PCT/IB2004/051128 on Jul. 5, 2004, now Pat. No. 8,020,000.

(51) Int. Cl.
| | |
|---|---|
| H04N 21/435 | (2011.01) |
| H04N 21/458 | (2011.01) |
| H04N 21/44 | (2011.01) |
| H04N 21/439 | (2011.01) |
| H04N 21/6587 | (2011.01) |
| H04N 19/467 | (2014.01) |
| H04N 21/433 | (2011.01) |
| H04N 21/231 | (2011.01) |

(52) U.S. Cl.
CPC ......... *H04N 21/433* (2013.01); *H04N 21/435* (2013.01); *H04N 21/4394* (2013.01); *H04N 21/44008* (2013.01); *H04N 21/4586* (2013.01); *H04N 21/6587* (2013.01); *H04N 21/8126* (2013.01); *H04N 21/8133* (2013.01)

(58) Field of Classification Search
CPC ........... H04N 21/6587; H04N 21/4586; H04N 19/467; H04N 21/23109; H04N 21/8126; H04N 21/433
See application file for complete search history.

(56) References Cited

U.S. PATENT DOCUMENTS

| | | | |
|---|---|---|---|
| 7,185,201 B2 | 2/2007 | Rhoads et al. | |
| 7,444,353 B1 | 10/2008 | Chen et al. | |
| 8,020,000 B2* | 9/2011 | Oostveen | H04N 19/467 713/176 |
| 8,660,267 B2* | 2/2014 | Oostveen | H04N 19/467 380/204 |
| 9,066,114 B2* | 6/2015 | Oostveen | H04N 19/467 |
| 9,407,962 B2* | 8/2016 | Oostveen | H04N 19/467 |
| 9,479,831 B2* | 10/2016 | Oostveen | H04N 19/467 |
| 9,712,853 B2* | 7/2017 | Oostveen | H04N 19/467 |
| 2002/0028000 A1 | 3/2002 | Conwell et al. | |
| 2002/0032864 A1 | 3/2002 | Rhoads et al. | |
| 2002/0033844 A1 | 3/2002 | Levy et al. | |
| 2002/0082731 A1 | 6/2002 | Pitman et al. | |
| 2002/0083060 A1 | 6/2002 | Wang et al. | |
| 2002/0116195 A1 | 8/2002 | Pitman et al. | |
| 2002/0178410 A1 | 11/2002 | Haitsma et al. | |
| 2002/0199009 A1 | 12/2002 | Willner et al. | |
| 2003/0002638 A1 | 1/2003 | Kaars | |
| 2003/0021441 A1 | 1/2003 | Levy et al. | |
| 2003/0023852 A1 | 1/2003 | Wold | |
| 2003/0120923 A1 | 6/2003 | Gilman et al. | |
| 2003/0231868 A1 | 12/2003 | Herley | |
| 2004/0001161 A1 | 1/2004 | Herley | |
| 2004/0073799 A1 | 4/2004 | Hitz et al. | |
| 2004/0189873 A1 | 9/2004 | Konig et al. | |
| 2004/0194130 A1 | 9/2004 | Konig et al. | |
| 2005/0015802 A1 | 1/2005 | Masson | |
| 2005/0177372 A1 | 8/2005 | Wang et al. | |
| 2006/0015855 A1 | 1/2006 | Kumamoto | |
| 2006/0122839 A1 | 6/2006 | Li-Chun Wang et al. | |
| 2006/0277409 A1 | 12/2006 | Galwas | |
| 2008/0209466 A1 | 8/2008 | Ishida et al. | |
| 2012/0016876 A1 | 1/2012 | Oostveen et al. | |
| 2014/0130077 A1 | 5/2014 | Oostveen et al. | |
| 2015/0189380 A1 | 7/2015 | Oostveen et al. | |
| 2016/0269780 A1 | 9/2016 | Oostveen et al. | |

FOREIGN PATENT DOCUMENTS

| | | |
|---|---|---|
| WO | WO 2001061508 A1 | 8/2001 |
| WO | WO 2001071960 A1 | 9/2001 |
| WO | WO 0208945 A1 | 1/2002 |
| WO | WO 2003043329 A2 | 5/2003 |
| WO | WO 03096337 A2 | 11/2003 |
| WO | WO 05006758 A1 | 1/2005 |

OTHER PUBLICATIONS

U.S. Appl. No. 10/564,297, Examiner Interview Summary dated Oct. 12, 2010, 4 pages.
U.S. Appl. No. 10/564,297, Examiner Interview Summary dated Oct. 12, 2010, 1 page.
U.S. Appl. No. 10/564,297, Final Office Action dated Dec. 22, 2010, 10 pages.
U.S. Appl. No. 10/564,297, Final Office Action dated Apr. 1, 2010, 13 pages.
U.S. Appl. No. 10/564,297, Non-Final Office Action dated Oct. 26, 2009, 11 pages.
U.S. Appl. No. 10/564,297, Notice of Allowance dated May 13, 2011, 5 pages.
U.S. Appl. No. 10/564,297, Preliminary Amendment filed Jan. 20, 2006, 4 pages.
U.S. Appl. No. 10/564,297, Response filed Jun. 29, 2010 to Final Office Action dated Apr. 1, 2010, 13 pages.
U.S. Appl. No. 10/564,297, Response filed Jan. 26, 2010 to Non-final Office Action dated Oct. 26, 2009, 13 pages.
U.S. Appl. No. 10/564,297, Response filed Oct. 12, 2010 to Non-Final Office Action dated Jul. 12, 2010, 14 pages.
U.S. Appl. No. 10/564,297, Response filed Mar. 16, 2011 to Final Office Action dated Dec. 22, 2010, 11 pages.
U.S. Appl. No. 10/564,297, Response filed Aug. 10, 2009 to Restriction Requirement dated Jul. 10, 2009, 4 pages.
U.S. Appl. No. 10/564,297, Restriction Requirement dated Jul. 10, 2009, 6 pages.
U.S. Appl. No. 13/220,267, Non-Final Office Action dated Mar. 20, 2013, 12 pages.
U.S. Appl. No. 13/220,267, Notice of Allowance dated Oct. 11, 2013, 9 pages.
U.S. Appl. No. 13/220,267, Preliminary Amendment filed Sep. 1, 2011, 11 pages.
U.S. Appl. No. 13/220,267, Response filed Jun. 18, 2013 to Non-Final Office Action dated Mar. 20, 2013, 15 pages.
U.S. Appl. No. 14/151,879, Final Office Action dated Feb. 24, 2015, 5 pages.
U.S. Appl. No. 14/151,879, Non-Final Office Action dated Oct. 10, 2014, 10 pages.
U.S. Appl. No. 14/151,879, Notice of Allowance dated Mar. 6, 2015, 8 pages.
U.S. Appl. No. 14/151,879, Preliminary Amendment filed Sep. 3, 2014, 11 pages.
U.S. Appl. No. 14/151,879, Response filed Jan. 12, 2015 to Non-Final Office Action dated Oct. 10, 2014, 18 pages.
U.S. Appl. No. 14/659,044, Non-Final Office Action dated Nov. 3, 2015, 8 pages.

(56) References Cited

OTHER PUBLICATIONS

U.S. Appl. No. 14/569,044, Notice of Allowance dated Mar. 30, 2016, 7 pages.
U.S. Appl. No. 14/569,044, Preliminary Amendment filed Mar. 23, 2015, 8 pages.
U.S. Appl. No. 14/659,044, Response filed Mar. 3, 2016 to Non-Final Office Action dated Nov. 3, 2015, 14 pages.
U.S. Appl. No. 15/164,605, Notice of Allowance dated Sep. 14, 2016, 13 pages.
U.S. Appl. No. 15/164,605, Preliminary Amendment filed May 27, 2016, 9 pages.
European Patent Application No. 04744496.3, Decision to Refuse dated May 17, 2010, 2 pages.
European Patent Application No. 04744496.3, Examination Report dated Aug. 4, 2008, 4 pages.
European Patent Application No. 04744496.3, Office Action dated Mar. 9, 2006, 2 pages.
European Patent Application No. 04744496.3, Office Action dated Jun. 4, 2007, 1 page.
European Patent Application No. 04744496.3, Office Action dated Dec. 21, 2006, 2 pages.
European Patent Application No. 04744496.3, Response filed Jan. 12, 2009 to Examination Report dated Aug. 4, 2008, 16 pages.
European Patent Application No. 04744496.3, Response filed Jul. 30, 2007 to Office Action dated Dec. 21, 2006, 3 pages.
International Patent Application No. PCT/IB2004/051128, International Preliminary Report on Patentability dated Jan. 16, 2006, 7 pages.
International Patent Application No. PCT/IB2004/051128, International Search Report dated Nov. 10, 2004, 3 pages.
International Patent Application No. PCT/IB2004/051128, Written Opinion dated Nov. 10, 2004, 6 pages.
Japan Patent Application No. 2006-518477, Office Action dated May 25, 2010, with English Translation of Claims, 5 pages.
Alattar, Adnan M., "Bridging Printed Media and the Internet Via Digimarc's Watermarking Technology," 5 pages, 2000.
Oostveen, J., et al., "Feature Extraction and a Database Strategy for Video Fingerprinting," Lecture Notes in Computer Science, 2314 (Mar. 11, 2002), pp. 117-128.
Ten Kate, W., "trigg&link—A New Dimension in Television Program Making," Lecture Notes in Computer Science 1997, Multimedia Applications, Services and Techniques—ECMAST '97, (1997), pp. 51-65.

\* cited by examiner

US 10,045,054 B2

METHOD AND DEVICE FOR GENERATING AND DETECTING A FINGERPRINT FUNCTIONING AS A TRIGGER MARKER IN A MULTIMEDIA SIGNAL

This application is a Continuation of U.S. patent application Ser. No. 15/273,185, filed Sep. 22, 2016, which is a Continuation of U.S. patent application Ser. No. 15/164,605, filed May 25, 2016and issued on Oct. 25, 2016 as U.S. Pat. No. 9,479,831, which is a Continuation of U.S. patent application Ser. No. 14/659,044, filed Mar. 16, 2015 and issued on Aug. 2, 2016 as U.S. Pat. No. 9,407,962, which is a Continuation of U.S. patent application Ser. No. 14/151,879, filed Jan. 10, 2014 and issued on Jun. 23, 2015 as U.S. Pat. No. 9,066,114, which is a Continuation of U.S. patent application Ser. No. 13/220,267, filed Aug. 29, 2011 and issued on Feb. 25, 2014 as U.S. Pat. No. 8,660,267, which is a Continuation of U.S. patent application Ser. No. 10/564,297, filed Jan. 10, 2006 and issued on Sep. 13, 2011 as U.S. Pat. No. 8,020,000, which is a U.S. National Stage Filing from International Patent Application No. PCT/IB2004/051128, filed Jul. 5, 2004, and published on Jan. 20, 2005 as WO 2005/006758, which claims priority to EP Application No. 03102116.5, filed Jul. 11, 2003, which applications are incorporated by reference herein in their entirety.

The invention relates to a method, and a corresponding device, of detecting trigger instants/information in a multimedia signal. The invention also relates to a method, and a corresponding device, of associating trigger information with a multimedia signal. Further, the invention relates to a computer readable medium having stored thereon instructions for causing one or more processing units to execute the method according to the invention.

A current trend is to enhance passive television viewing and/or music listening on a given playback device by creating more interactive programs and/or listening experiences or by "connecting" external actions to a piece of video andlor audio content. As one simple example, a commercial can be enhanced by embedding a URL to a web site with further information, where the URL can be extracted and retrieved by the playback device. In order to facilitate such a function it is necessary to enable a reliable detection of time points in a television program, a movie, a music piece, etc. where such additional information is relevant.

Examples of situations where such additional information is useful or interesting in connection with a broadcast program are:
  trigg&link: (see e.g. W. ten Kate et. al. trigg&link—A new dimension in television program making", Lecture Notes in computer Science, vol. 1242, pp 51-65, Springer, 1997) trigg&link allows interactivity in television programs. In addition to the normal program, additional information concerning specific segments of the program is available to the viewer through a different distribution channel. At the start of a given segment that is associated with an enhancement (additional information) an icon is displayed, alerting the viewer that additional information may be viewed on his TV. For instance, at the appearance of an actor in a movie, some biographic data of the actor may be made available. In the user terminal (e.g. a set top box, etc.) the icons are overlayed on the video at the relevant time instants, thereby requiring these instants to have been indicated in the video stream.
  Local Insertion: During a national broadcast, specific parts of the program may be replaced by a regional program in some regions. For instance, some advertisements may be replaced by advertisements for local shops, or, in a news show some regions may have their local weather forecast rather than the national one. The national program producer can indicate which segments are suitable for such local insertion. At the local redistribution site (e.g. at the cable head-end), the indicated segments may be replaced by local content.

In both of the above situations, it is necessary to mark or associate specific time instants in the video stream at which additional information should be available. At these time instants the receiver should be triggered to perform or provide some kind of action. This may be done by such mechanisms as DSM-CC in MPEG/DVB. However, this requires the broadcaster's cooperation to insert these triggers thereby making an enhancement service provider dependent on the broadcaster.

One previously known way of performing time marking in a video stream is e.g. using fields of the MPEG transport stream structure that can be used to hold the marking information.

Another previously known way is using a blanking interval. In analog distribution, the marking information can be embedded in the vertical blanking interval or in the inactive video lines.

Both of the above known ways need the cooperation of all actors in the broadcast chain to make sure that the marking information is not destroyed before the signal arrives at its destination. For instance, in case of the MPEG solution, a re-multiplexing operation could easily remove information that is written in the user data fields in the stream. Moreover, every decoding and successive re-encoding step would certainly not retain this information. In case of the use of the vertical blanking for carrying the trigger information, the situation is even more difficult, as actors in the broadcast chain might write other information at the same position (the vertical blanking is used for many things and there is no uniform agreement about the control over usage of the blanking interval). Also, standards converters (like PAL-NTSC) and other equipment in the broadcast chain may not retain all information in the vertical blanking interval.

Yet another way is using watermarking. A watermark may be embedded in the video frames at the relevant time instants. The Philips Watercast System is, among others, being sold for this purpose. A disadvantage of watermarking is the fact that it necessarily changes the video/audio.

It is an object of the invention to provide a method and corresponding device of relating one or more trigger actions with a multimedia signal and corresponding method and device for detecting one or more trigger actions in a multimedia signal that solves the above-mentioned problems. A further object is to provide this in a simple and efficient way. Another object is to enable simple, reliable and accurate localisation of a given part of a multimedia signal. A further object is to enable detection of trigger actions without modifying the multimedia signal.

This is achieved by a method (and corresponding device) of relating one or more trigger actions with a multimedia signal, the method comprising the steps of
  providing at least one trigger time point and for each trigger time point providing at least one representation of least one associated trigger action, where each trigger time point indicates a time point of the multimedia signal for which the at least one associated trigger action is to be available during playback of the multimedia signal, and
  for each given trigger time point deriving a fingerprint on the basis of a. segment of the multimedia signal, where the segment of the multimedia signal is unambiguously related with the given trigger time point, and by a method (and corresponding device) of detecting one or more trigger actions in a multimedia signal, the method comprising the steps of:

generating a fingerprint stream on the basis of the multimedia signal, comparing a segment of the fingerprint stream with one or more fingerprints stored in a second database in order to determine if a match exists or not between the segment and a fingerprint in the second database, the second database further comprising for each stored fingerprint at least one representation of at least one associated action, and if a match exists retrieving the at least one representation of the at least one associated action associated with the matching fingerprint.

In this way, a simple and efficient way of handling time markers in a multimedia signal fur given actions is obtained. A fingerprint thereby serves as a trigger of a particular action, event, etc. associated with a particular point in time of the multimedia signal. Further, this is enabled without the multimedia signal needing to be modified. Additionally, the time marking detection is time independent as it is dependent on the specific content of the multimedia signal only thereby avoiding problems if a multimedia signal being a television program or the like is delayed.

A fingerprint of a multimedia object/content/signal is a representation of perceptual features of the object/content/signal part in question. Such fingerprints are sometimes also known as "(robust) bashes". More specifically, a fingerprint of a piece of audio or video is an identifier which is computed over that piece of audio or video and which does not change even if the content involved is subsequently transcoded, filtered or otherwise modified.

Preferably, the derived fingerprint is an audio and/or video fingerprint. Alternatively, animations and/or streaming text, etc, is used as a source for creating a fingerprint.

Advantageous embodiments of the methods and devices according to the present invention are defined in the subclaims.

Further, the invention also relates to a computer readable medium having stored thereon instructions for causing one or more processing units to execute the method according to the present invention.

FIG. 1a schematically illustrates generation of fingerprint(s) used as trigger marker(s) according to the present invention.

FIG. 1b schematically illustrates detection and use of fingerprint(s) as trigger marker(s) according to the present invention.

Figure 1A:
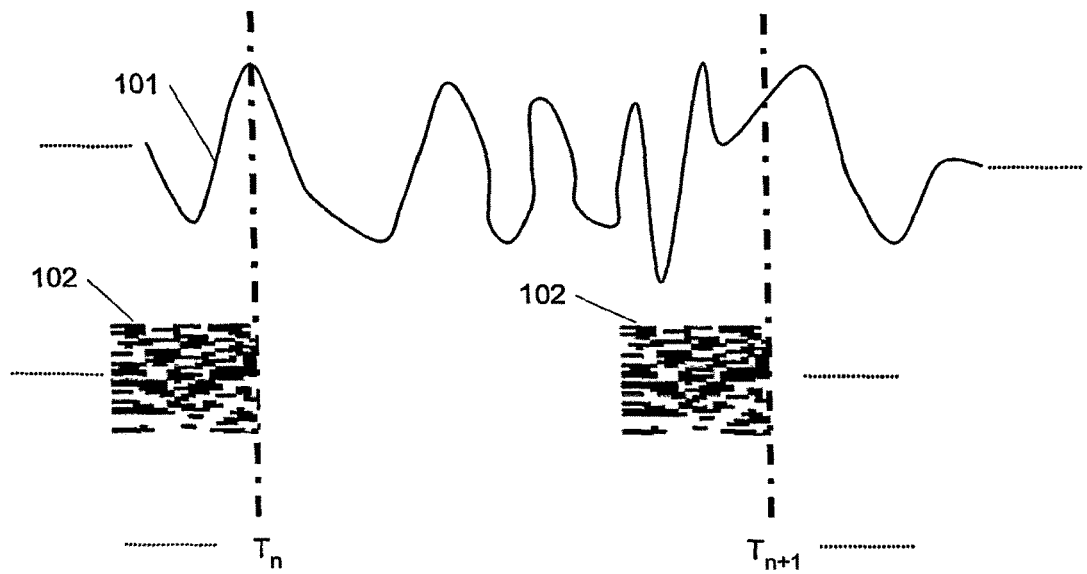

FIG. 1a schematically illustrates generation of fingerprint(s) used as trigger marker(s) according to the present invention.

Shown is a digital or analog multimedia signal (101) comprising video and/or audio information/content, where one or more 'trigger' actions (forth denoted actions) is to be associated/related with the multimedia signal (101) at certain given 'trigger' time points (forth denoted time points). The one or more actions associated with each time point is to be available, i.e. triggered, at that given particular time point $(T_n; T_{n+1})$ during playback on a playback device. The notation '$(T_n; T_{n+1})$' for a given time point signifies that the time point may be either the shown time point $T_n$ or the shown time point $T_{n+1}$ or in general any suitable (not shown) time point of the signal (101). The associated actions of multiple time points may be the same, different and/or a mix thereof.

The action(s) to be presented/triggered at a given time point may e.g. comprise retrieving and displaying additional information on a display (e.g. presenting biography data for an actor being shown by the multimedia signal, presenting a selectable URL to a web site containing additional information, etc.), retrieving and playing additional information via a speaker, playing another multimedia signal instead of said multimedia signal (101) for a predetermined or variable period of time (e.g. a local weather forecast, a local commercial, etc.) and/or the like. Other examples of action(s) are e.g. stopping/pausing, e.g. temporarily, display/play, executing other control commands, and/or preparing the system for user input(s), e.g. once the trigger action is executed the system waits (for some time) for a specific action of the user. If the trigger action was not executed, the user input will not have any influence. For example, in interactive games the user may only submit his answer after the trigger action has fired/been executed.

For each time point $(T_n; T_{n+1})$ a fingerprint (102) is generated on the basis of a part, segment. etc. (forth denoted segment) of the multimedia signal (101), where the segment of the multimedia signal (101) is unambiguously related with the given time point $(T_n; T_{n+1})$. Preferably, the segment of the multimedia signal (101) is unambiguously related with the given time point $(T_n; T_{n+1})$ by letting the segment of the multimedia signal (101) ending substantially at the given time point $(T_n; T_{n+1})$. In alternative embodiments, the segment of the multimedia signal (101) may start substantially at the given time point $(T_n; T_{n+1})$, the segment of the multimedia signal (101) is starting or ending at a predetermined distance before or after the given trigger time point $(T_n; T_{n+1})$, or the given time point $(T_n; T_{n+1})$ may be at a predetermined time point between a start and an end of the segment of the multimedia signal (101).

The size of the fingerprints and/or the segments may both be of a predetermined fixed size or alternatively of a variable size.

One method for computing a robust fingerprint is described in European patent application 01200505.4, although of course any method for computing a robust fingerprint can be used.

European patent application 01200505.4 describes a method that generates robust fingerprints for multimedia content such as, for example, audio clips, where the audio clip is divided in successive (preferably overlapping) time intervals. For each time interval, the frequency spectrum is divided in bands. A robust property of each band (e.g. energy) is computed and represented by a respective fingerprint bit.

Multimedia content is thus represented by a fingerprint comprising a concatenation of binary values, one for each time interval. The fingerprint does not need to be computed over the whole multimedia content, but can be computed when a portion of a certain length has been received. There can thus be plural fingerprints for one multimedia content, depending on which portion is used to compute the fingerprint over.

Further, video fingerprinting algorithms are known, e.g. from the following disclosure: Job Oostveen, Ton Kalker, Jaap Haitsma: "Feature Extraction and a Database Strategy for Video Fingerprinting". 117-128. IN: Shi-Kuo Chang, Zhe Chen, Suh-Yin Lee (Eds.): Recent Advances in Visual Information Systems, 5th International Conference, VISUAL 2002. Hsin Chu, Taiwan, Mar. 11-13, 2002, Proceedings. Lecture Notes in Computer Science 2314 Springer 2002.

According to the present invention, a fingerprint (102) is generated for each time point on the basis of a given segment of the multimedia signal (101) at or near the specific time point.

In this way, a given fingerprint (102) is a trigger marker enabling a very accurate and very precise location of a given time point of the signal (101) without using the specific time point but instead using (a segment of) the signal. Further, this is enabled without changing the signal. For video fingerprinting the localisation is typically frame accurate, at least as long as any distortion of the video signal is not too severe.

After a fingerprint (102) has been generated it is stored for later use in a database, memory, storage and/or the like.

There are several advantages in storing fingerprints (102) for a multimedia signal (101) in a database instead of the multimedia signal itself. To name a few: The memory/storage requirements for the database are reduced.

The comparison of fingerprints is more efficient than the comparison of the multimedia signals themselves, as fingerprints are substantially shorter than the signals.

Searching in a database for a matching fingerprint is more efficient than searching for a complete multimedia signals, since it involves matching shorter items.

Searching for a matching fingerprint is more likely to be successful, as small changes to a multimedia signal (such as encoding in a different format or changing the bit rate) do not affect the fingerprint.

Alternatively, if the multimedia content is in the form of more than a single signal, e.g. a separate audio signal and a separate video signal, the fingerprint(s) (102) may be generated on the basis of a single of them (audio or video) or on both.

The generated fingerprints (102) stored in the database may then be distributed to playback devices via the Internet or in a side-channel of a broadcast channel or via some other channel or other means for use during playback according to the present invention. As other examples of distribution is e.g. physical distribution on a storage medium or in a non-electronic way, e.g. requiring the user to enter the fingerprints and actions manually into the playback device.

In a preferred embodiment, a representation of the associated action(s) is also stored for each fingerprint in the database. These representations are preferably also sent to the playback devices. In an alternative embodiment, representations are not stored in the database or used at all when generating the fingerprints. Another party may then provide the representations to the relevant playback devices as well as a relationship between each fingerprint and its associated action(s).

Figure 1B:
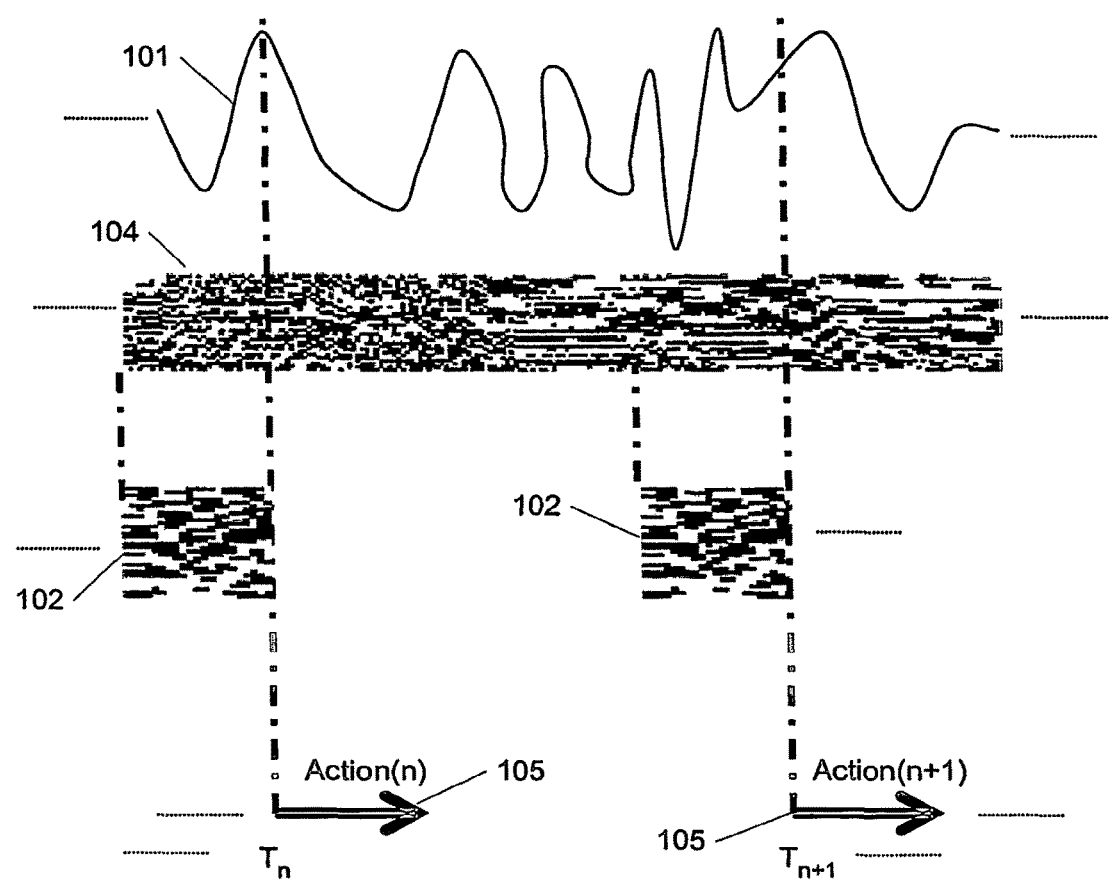

FIG. 1b schematically illustrates detection and use of fingerprint(s) as trigger marker(s) according to the present invention. Shown is a digital or analog multimedia signal (101) comprising video and/or audio information/content, where the signal (101) is played back by a suitable playback device. Further shown is a fingerprint stream (104) that is generated continuously or substantially continuously on the basis of the multimedia signal (101). Alternatively, the fingerprint stream (104) is generated in segments. The fingerprint stream (104) (or segments) is compared with fingerprints (102) stored in a database. The stored fingerprints (102) generated as explained in connection with FIG. 1a at a production site. The database preferably also comprises representations of the one or more associated actions (105) for each stored fingerprint (102). The stored fingerprints (102) are e.g. received via the Internet or in a side-channel of a broadcast channel or via some other channel or other means from the distribution site. The representations of the associated action(s) (105) may also be received like this. In an alternative embodiment, the representations as well as a relationship between each fingerprint and its associated action(s) (105) are provided by another party.

When a match between a segment of the fingerprint stream (104) and a given fingerprint (102) in the database is found the representation(s) of the associated action(s) (105) of that particular fingerprint (102) is retrieved and executed at the appropriate time point ($T_n$; $T_{n+1}$). When a match between a segment of the fingerprint stream (104) and a fingerprint (102) in the database, the appropriate time point ($T_n$, $T_{n+1}$) is also determined when the fingerprints (102) have been generated as explained in connection with FIG. 1a. Preferably, the given time point ($T_n$; $T_{n+1}$) is determined by letting the segment of the multimedia signal (101) that the matching fingerprint originally has been based on during generation (according to FIG. 1a) ending substantially at the given time point ($T_n$; $T_{n+1}$). In alternative embodiments, the segment of the multimedia signal (101) may start substantially at the given time point ($T_n$; $T_{n+1}$), the segment of the multimedia signal (101) is starting or ending at a predetermined distance before or after the given trigger time point ($T_n$; $T_{n+1}$) or the given time point ($T_n$; $T_{n+1}$) may be at a predetermined time point between a start and an end of the segment of the multimedia signal (101). The playback device simply needs to be aware of the relationship between a given fingerprint and the given time point used during generation.

When a matching fingerprint (102) is determined, the associated one or more actions is also retrieved. The playback device may then execute these actions or present them to a user e.g. awaiting user confirmation before executing them.

The above-mentioned European patent application 01200505.4 describes various matching strategies for matching fingerprints computed for an audio clip with fingerprints stored in a database.

Further European patent application 01202720.7 describes an efficient method of matching a fingerprint representing an unknown information signal with a plurality of fingerprints of identified information signals stored in a database to identify the unknown signal. This method uses reliability information of the extracted fingerprint bits. The fingerprint bits are determined by computing features of an information signal and thresholding said features to obtain the fingerprint bits. If a feature has a value very close to the threshold, a small change in the signal may lead to a fingerprint bit with opposite value. The absolute value of the difference between feature value and threshold is used to mark each fingerprint bit as reliable or unreliable. The reliabilities are subsequently used to improve the actual matching procedure.

A further advantage of the present invention is that if for any reason the broadcast is delayed, the fingerprint matching ensures that the trigger actions still appear at the correct corresponding moment in the broadcast since the invention is time-independent but content-dependent.

Figure 2:
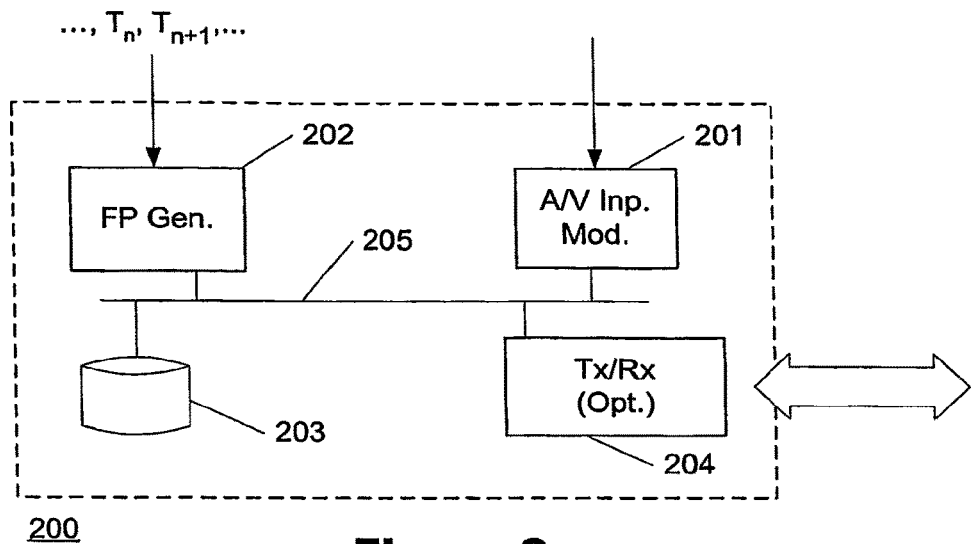
FIG. 2 illustrates a schematic block diagram of a fingerprint generation device according to the present invention.

FIG. 2 illustrates a schematic block diagram of a fingerprint generation device according to the present invention. Shown is fingerprint generation device (200) comprising a multi-media signal input module (201), a fingerprinting module (202), a data base, memory storage and/or the like (203) communicating via a bus (205) or the like under the control of one or more microprocessors (not shown). The fingerprint generation device (200) may in one embodiment optionally also comprise a transmitter and receiver (204) for communicating with other systems, devices, etc. via a wired and/or wireless network e.g. like the Internet.

The multi-media signal input module (201) receives multimedia content e.g. in the form of an analog or digital audio and/or video signal and feeds the multimedia content to the fingerprinting module (202). The fingerprinting module (202) computes a fingerprint on the basis of the received multi-media content. A fingerprint may be derived for the entire content or for a part of the content. Alternatively, several fingerprints may be derived each from a different part. According to the present invention, a fingerprint is derived each time that a trigger action is needed, i.e. for each time point ($T_n$; $T_{n+2}$), as explained in connection with FIG. 1a. A representation of the time point(s) is also supplied to the fingerprinting module (202).

Figure 4:
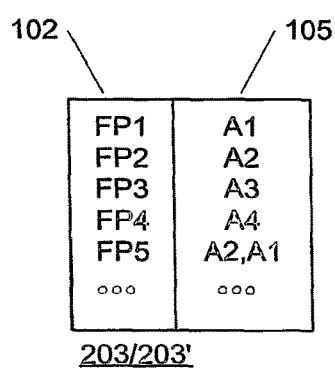
FIG. 4 illustrates one example of tables/records according to the present invention.

The fingerprinting module (202) then supplies the computed fingerprint(s) to the database (203) preferably together with the associated one or more actions for each fingerprint. As shown in FIG. 4, the database (203) comprises fingerprints 'FP1', 'FP2', 'FP3', 'FP4', 'FP5', etc. and respective associated actions 'A1', 'A2', 'A3', 'A4', 'A2, A1', etc.

The database (203) can be organized in various ways to optimize query time and/or data organization. The output of the fingerprinting module (202) should be taken into account when designing the tables in the database (203). In the embodiment shown in FIG. 4, the database (203) comprises a single table with entries (records) comprising respective fingerprints and associated (sets) of actions.

Figure 3:
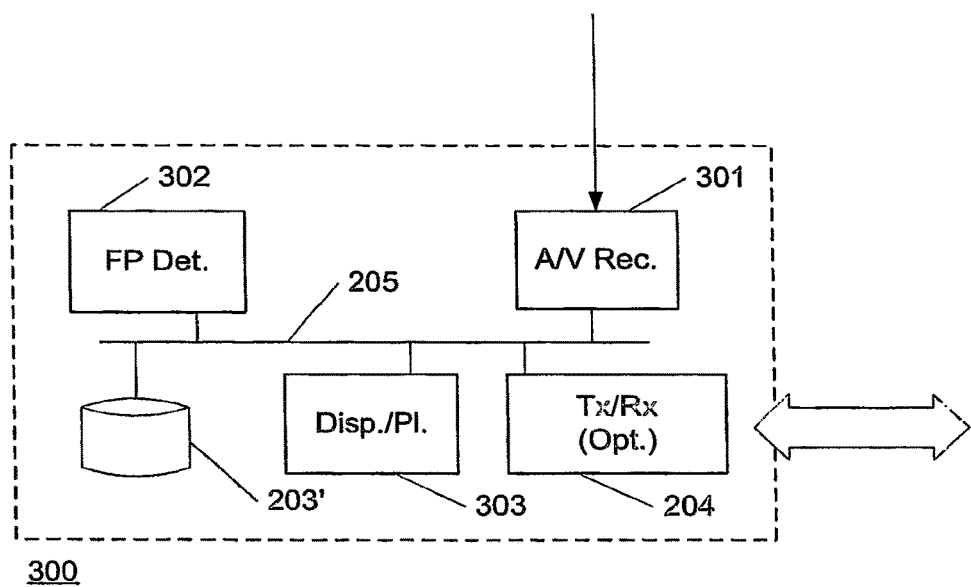
FIG. 3 illustrates a schematic block diagram of a playback device detecting and using fingerprints according to the present invention.

FIG. 3 illustrates a schematic block diagram of a playback device detecting and using fingerprints according to the present invention. Shown is a playback device (300) comprising a multimedia signal receiver (301), a fingerprint detector (302), a display/play circuit (303), a data base, memory storage and/or the like (203') communicating via a bus (205) or the like under the control of one or more microprocessors (not shown). The playback device (300) may in one embodiment optionally also comprise a transmitter and receiver (204) for communicating with other systems, devices, etc. via a wired and/or wireless network e.g. like the Internet.

The multimedia signal receiver (301) receives the multimedia signal e.g. in the form of an analog or digital audio and/or video signal to be displayed and/or played e.g. from a broadcasting cable, antenna, satellite dish, etc. arrangement (not shown). The received multimedia signal is fed to the fingerprint detector (302) that derives a fingerprint stream or segments thereof and determines if there are any matches with fingerprints stored in the database as explained in connection with FIG. 1b. If a match is found then a representation of the associated action(s) is also retrieved. The appropriate time point for the associated action(s) is given by the matching fingerprint as described above.

The received multimedia signal is displayed and/or played by the a display/play circuit (303) and at the appropriate time point(s) the associated action(s) is executed or presented to a user e.g. awaiting user confirmation before executing the action(s).

Preferably, the data layout of the database (203') corresponds to the one shown in FIG. 4.

The playback device (300) may also comprise a buffer mechanism (not shown) for buffering a part of the multimedia signal before displaying/playing it.

FIG. 4 illustrates one example of tables/records according to the present invention. Shown is a table comprising fingerprints (102) 'FP1', 'FP2', 'FP3', 'FP4', 'FP5', etc. and respective associated actions (105) 'A1', 'A2', 'A3', 'A4', 'A2, A1', etc. One or more actions (105) are stored for each fingerprint (102). A given fingerprint (102) is only stored in the table once.

In the claims, any reference signs placed between parentheses shall not be constructed as limiting the claim. The word "comprising" does not exclude the presence of elements or steps other than those listed in a claim. The word "a" or "an" preceding an element does not exclude the presence of a plurality of such elements.

The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A non-transitory machine-readable storage medium having stored thereon, program instructions that when executed by a processor of a machine, cause the machine to perform operations comprising:
   playing multimedia content on a multimedia playback device;
   during the playback of the multimedia content by the multimedia playback device, repeatedly deriving, by the multimedia playback device, fingerprints from respective segments of the multimedia content;
   comparing the derived fingerprints to one or more reference fingerprints representing features of the multimedia content, wherein each reference fingerprint is associated with an action;
   determining that one of the derived fingerprints matches one of the one or more reference fingerprints; and
   in response to determining that the one of the derived fingerprints matches the one of the one or more reference fingerprints, causing execution of the action associated with the one of the one or more reference fingerprints,
   wherein the action to be executed is associated with a time point indicating when, in the multimedia content, the action is to be executed.

2. The non-transitory machine-readable storage medium of claim 1, wherein the multimedia playback device comprises a display, and
   wherein playing the multimedia content on the multimedia playback device comprises displaying at least some of the multimedia content on the display.

3. The non-transitory machine-readable storage medium of claim 1, wherein the multimedia playback device comprises a speaker, and
   wherein playing multimedia content on the multimedia playback device comprises playing at least some of the multimedia content via the speaker.

4. The non-transitory machine-readable storage medium of claim 1, wherein the action to be executed comprises at least one action in the group consisting of:

retrieving and displaying additional information on a display; and retrieving and playing additional information via a speaker.

5. The non-transitory machine-readable storage medium of claim 1, wherein the action to be executed comprises playing another multimedia content instead of the multimedia content for a period of time.

6. The non-transitory machine-readable storage medium of claim 1, wherein the action to be executed comprises at least one action in the group consisting of:

presenting biography data for an actor appearing in the multimedia content;
presenting a link to a website;
playing a local weather forecast;
playing a local commercial;
executing a control command; and
preparing the playback device to receive a user input.

7. The non-transitory machine-readable storage medium of claim 1, wherein the operations further comprise:

receiving, by the multimedia playback device, the reference fingerprints;
storing the received reference fingerprints in the non-transitory machine readable storage medium for comparison with the derived fingerprints;
receiving, by the multimedia playback device, for each of the received reference fingerprints, representations of the action with which the received reference fingerprint is associated; and
storing each of the received representations in association with its respectively associated reference fingerprint.

8. A non-transitory machine-readable storage medium having stored thereon, program instructions that when executed by a processor of a machine, cause the machine to perform operations comprising:

receiving, by a signal receiver of a media playback device, a first media stream;
playing, on at least one of a display or a speaker associated with the media playback device, the first media stream;
determining, by the processor of the machine, a trigger fingerprint from a segment of the first media stream, wherein the trigger fingerprint is a representation of features of the segment;
matching the trigger fingerprint to a reference fingerprint, wherein the reference fingerprint is stored in a database of reference fingerprints and is associated with a reference action, and wherein the reference action instructs the media playback device to replace playback of the first media stream with playback of a second media stream, wherein the reference action is associated with a time point indicating when, in the first media stream, the reference action is to be performed; and
responsive to matching the trigger fingerprint to the reference fingerprint, playing, on the at least one of the display or the speaker associated with the media playback device, the second media stream in place of the first media stream.

9. The non-transitory machine-readable storage medium of claim 8, wherein playing of the second media stream in place of the first media stream occurs at the time point.

10. The non-transitory machine-readable storage medium of claim 8, wherein the trigger fingerprint is one of a plurality of trigger fingerprints determined from respective segments of the first media stream.

11. The non-transitory machine-readable storage medium of claim 8, wherein the operations further comprise:

before determining the trigger fingerprint, receiving, by the media playback device, a plurality of reference fingerprints that includes the matched reference fingerprint;
storing the received reference fingerprints at the media playback device for comparison with the trigger fingerprint;
receiving, by the media playback device, for each of the received reference fingerprints, representations of one or more actions with which the received reference fingerprint is associated; and
storing each of the received representations in association with its respectively associated reference fingerprint.

12. The non-transitory machine-readable storage medium of claim 8, wherein playing, on the at least one of a display or a speaker associated with the media playback device, the first media stream comprises playing the first media stream on the display, and wherein playing, on the at least one of the display or the speaker associated with the media playback device, the second media stream in place of the first media stream comprises playing, on the speaker, the second media stream in place of the first media stream.

13. The non-transitory machine-readable storage medium of claim 8, wherein playing, on the at least one of a display or a speaker associated with the media playback device, the first media stream comprises playing the first media stream on the display, and wherein playing, on the at least one of the display or the speaker associated with the media playback device, the second media stream in place of the first media stream comprises playing, on the display, the second media stream in place of the first media stream.

14. A non-transitory machine-readable storage medium having stored thereon, program instructions that when executed by a processor of a machine, cause the machine to perform operations comprising:

accessing, by the processor, a plurality of reference fingerprints generated from respective segments of multimedia content, each of the reference fingerprints being associated with a corresponding action;
determining that a trigger fingerprint generated by a multimedia playback device matches a particular reference fingerprint of the plurality of reference fingerprints, wherein the particular reference fingerprint is associated with a particular action; and
transmitting, by the processor, a representation of the particular action to a recipient device,
wherein reception of the representation of the particular action causes the recipient device to perform the particular action,
wherein the particular action is associated with a time point indicating when, in the multimedia content, the particular action is to be performed.

15. The non-transitory machine-readable storage medium of claim 14, wherein the operations further comprise:

generating, by the processor, the plurality of reference fingerprints from the respective segments of multimedia content; and
storing, by the processor, the plurality of reference fingerprints and the corresponding action in association in a memory device.

16. The non-transitory machine-readable storage medium of claim 15, wherein the particular reference fingerprint is also associated with a time point in the multimedia content, wherein the time point is also stored in the memory, and wherein the particular action is performed at the time point in the multimedia content associated with the particular reference fingerprint.

17. The non-transitory machine-readable storage medium of claim 14, wherein the particular action comprises displaying information related to the segment of multimedia content from which the particular reference fingerprint was generated.

18. The non-transitory machine-readable storage medium of claim 14, wherein the performance of the particular action occurs during playback, by the multimedia playback device, of the segment of multimedia content associated with the particular reference fingerprint.

19. The non-transitory machine-readable storage medium of claim 14, wherein the recipient device is the multimedia playback device.

20. The non-transitory machine-readable storage medium of claim 14, wherein the operations further comprise sending, to the multimedia playback device, the plurality of reference fingerprints.

\* \* \* \* \*